United States Patent Office 3,441,827
Patented Apr. 29, 1969

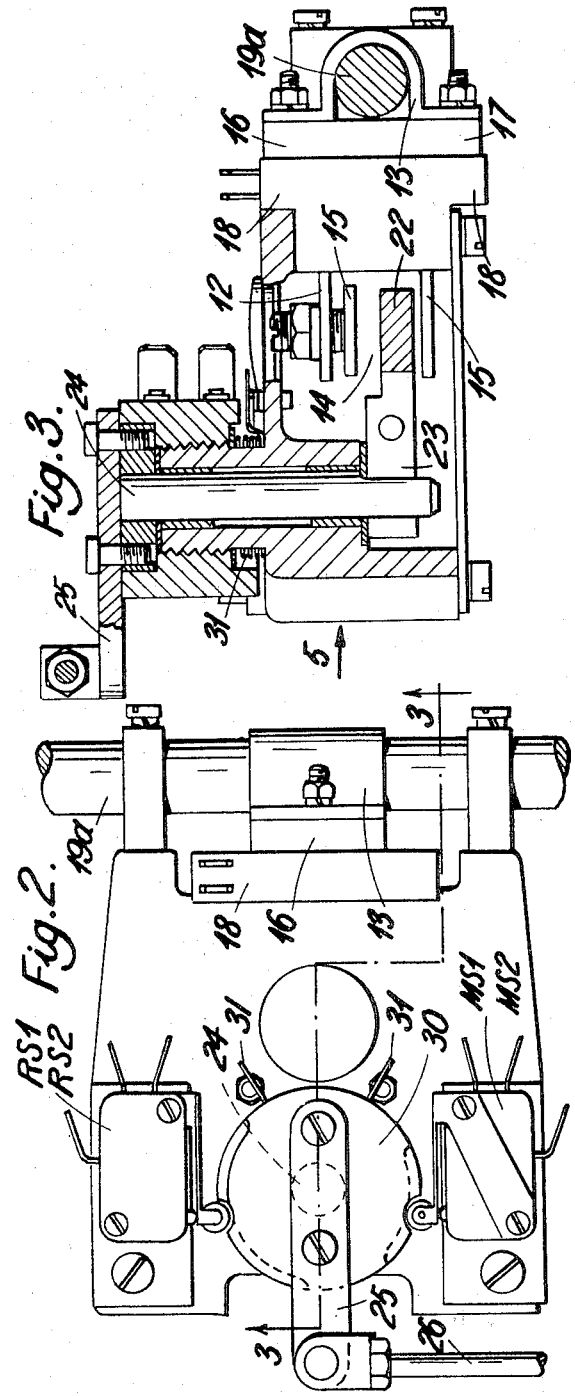

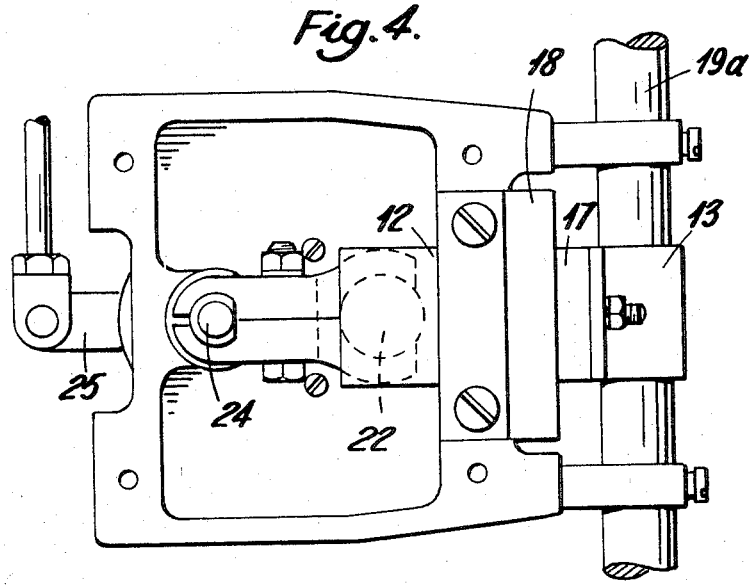
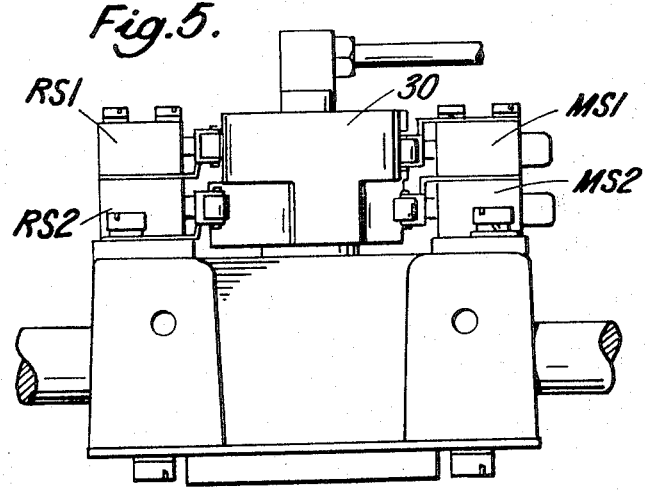

3,441,827
CONTROL SYSTEMS FOR DIRECT CURRENT
ELECTRIC MOTORS
Ivan Salisbury Payne, Basingstoke, England, assignor to Lansing Bagnall Limited, Basingstoke, Hampshire, England, a British company
Filed July 13, 1966, Ser. No. 564,921
Claims priority, application Great Britain, July 14, 1965, 29,898/65
Int. Cl. H02p 5/06
U.S. Cl. 318—332          4 Claims

ABSTRACT OF THE DISCLOSURE

A direct current electrical drive system in which a direct current motor is connected to be energised by a direct current source and controllable switch means such as a thyristor is connected as a power switch between the source and the motor for energising the motor intermittently with current pulses. A speed control system which controls the feeding of control pulses to the controllable switch means comprises a saturable reactor carrying a winding through which armature current from the motor passes and another winding which constitutes a variable shunt between an astable multi-vibrator and the control input of the controllable switch means. A movable magnet is provided for adjusting the flux density in the saturable reactor independently of the armature current. Thus, when the armature current is relatively high, the variable shunt, due to the saturation of the reactor, is of low impedance and thereby inhibits the passage of control pulses to the thyristor. This inhibition is controlled by the magnet to vary the speed of the motor.

---

The invention relates to a control system for a direct current electric motor, for example, a battery operated series connected motor for an electric truck.

The invention provides a control system for a direct current electric motor comprising a generator of electric pulses, a pulse responsive circuit controlling current flow to the motor in accordance with pulses received by the responsive circuit and means for applying to the circuit a variable proportion of the pulses generated.

Conveniently the generator produces pulses of constant frequency, width and amplitude.

In one form of the invention the responsive circuit includes a thyristor controlling the current to the motor and the generator supplies "on" pulses, of which a proportion is applied to the thyristor gate to switch the thyristor on, there being means to switch the thyristor off after each operation thereof due to an "on" pulse. The switching off means may be pulse responsive and supplied with a constant succession of "off" pulses from the generator.

The means for applying a variable proportion of the pulses may comprise an adjustable saturable reactor controlling the passages of pulses to the responsive circuit according to the degree of saturation of the reactor. A reactor suitable for this purpose and having a number of important novel features is later described in detail, the reactor being referred to as a transductor.

Figure 1A:
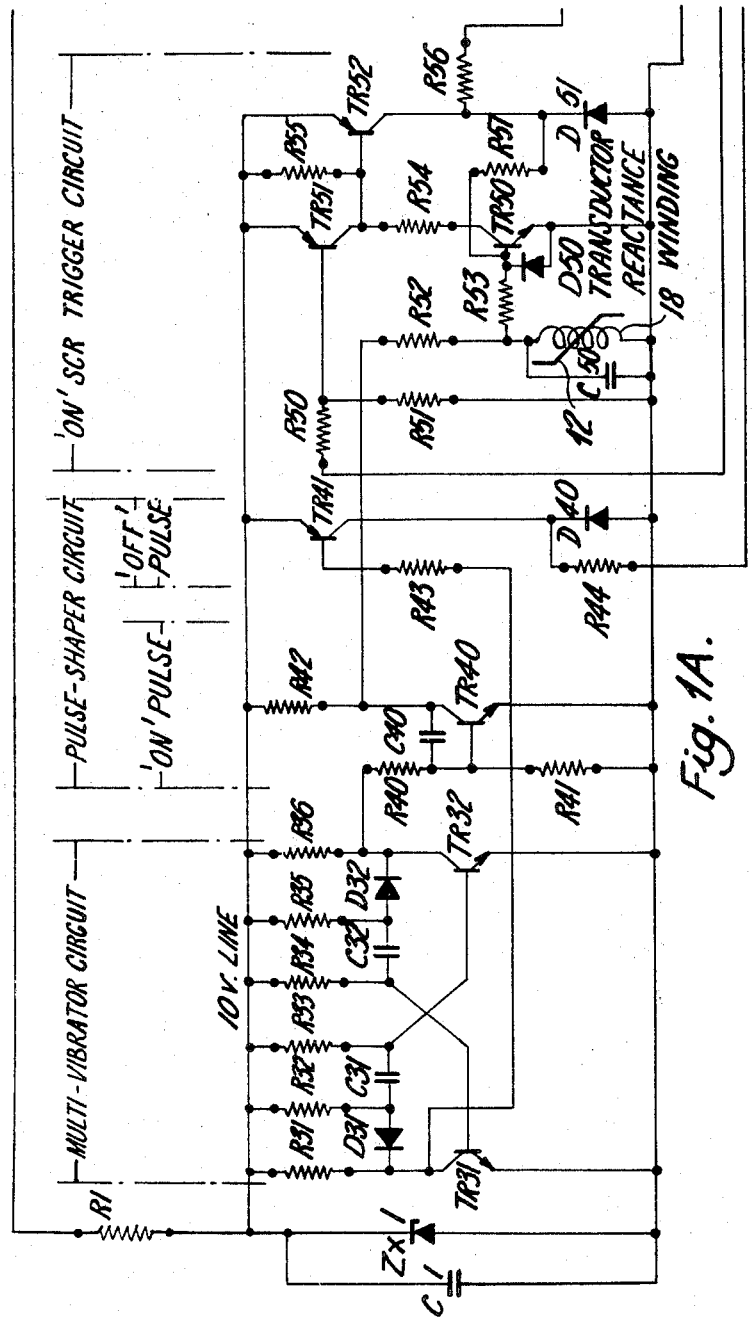
Figure 1B:
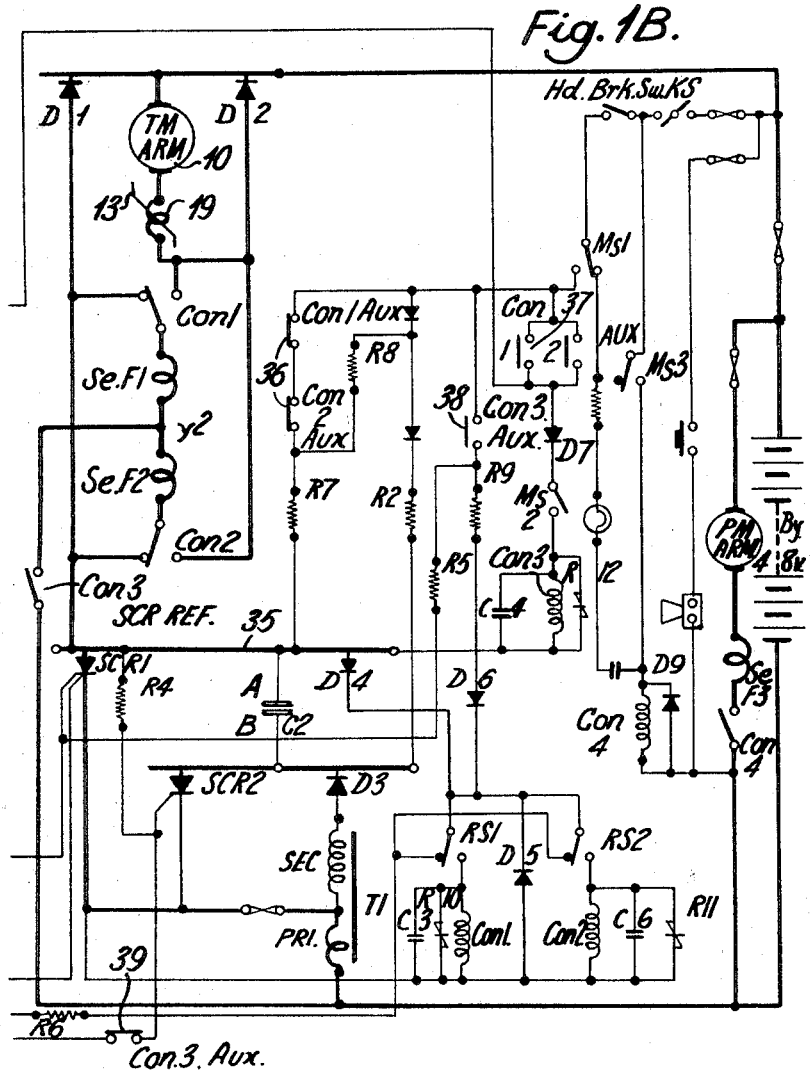

A specific embodiment of a motor control system as applied to the series wound traction motor of a battery operated industrial truck, will now be described, by way of example, with reference to the accompanying drawings in which:

FIGURES 1A and 1B together form a circuit diagram,
FIGURE 2 is a plan of a control unit,
FIGURE 3 is a section on the line 3—3 in FIGURE 2,
FIGURE 4 is an under plan of the unit with a cover removed,
FIGURE 5 is a view of the unit in the direction of the arrow 5 in FIGURE 3, and
FIGURES 6 to 9 are diagrams illustrating the operation of part of the control unit.

Referring first to FIGURE 1, the traction motor comprises an armature 10 and a series field winding $SeF_1$, $SeF_2$ with a centre tapping Y2. The motor is supplied from a 48 volt battery By which also supplies an auxiliary pump motor PM, $SeF_3$ forming no part of this invention.

During the starting and low speed operations, the traction motor current is controlled by two thyristors (silicon controlled rectifiers) SCR1 and SCR2 which are themselves controlled by a multi-vibrator circuit, a pulse-shaper circuit, a transductor and a trigger circuit as shown (mainly) to the left of FIGURE 1. The multi-vibrator circuit is a pulse generator which emits a continuous series of pulses of constant width, frequency and amplitude. These are of square wave form and the purpose of the pulse shaper circuit is to change the form to reduce the rate of rise of pulse voltage to suit the response of the transductor. The transductor regulates the supply of pulses to the trigger circuit which, in turn, fires the main thyristor SCR1.

The transductor, which is an integer of the control unit and constitutes the saturable reactor aforesaid, is an important part of the system and will now be described in detail. The transductor determines the acceleration, the current limit and controlled braking characteristics of the system. The transductor comprises a two-part double circuit magnetic core 12 and 13 with a main air gap 14 between poles 15 and a subsidiary air gap 16, 17 between the two parts, this gap being filled with non-magnetic material in the embodiment shown in FIGURES 2 to 5. Around the central, common, core part 12 there is a reactance winding 18. Around the core part 13 there is, as seen in the diagrams FIGURES 1 and 6 to 9, a single turn winding 19. In the actual construction seen in FIGURES 2 to 5 this is simply a straight length of cable 19a embraced by the part 13 and carrying the motor current. In the main air gap 14 between the poles 15 there is a movable permanent magnet 22, the magnet being carried on an arm 23 of non-magnetic material attached to a spindle 24 to which is secured an arm 25 connected by a link 26 to a control pedal (not shown).

Figure 6:
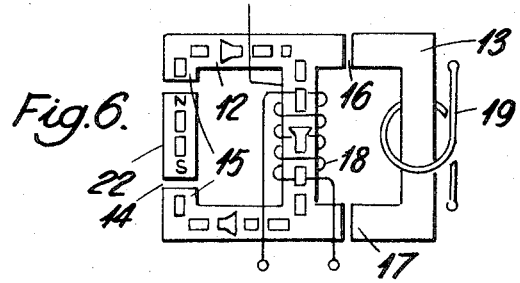
Figure 7:
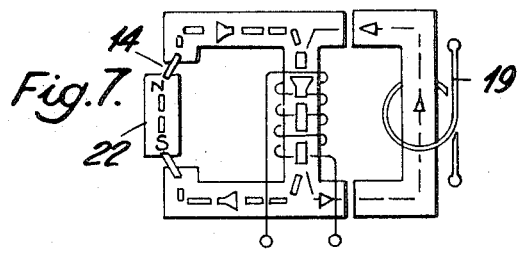
Figure 8:
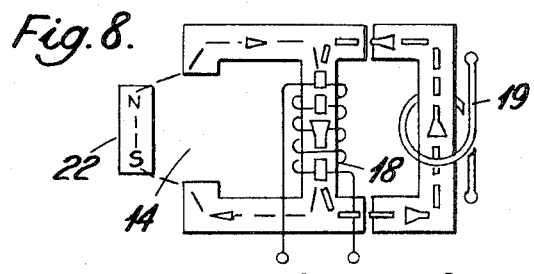
Figure 9:
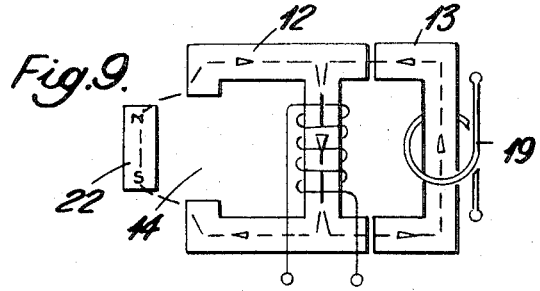

The reactance winding 18 is connected between the pulse output from the "on" transistor TR40 of the shaper circuit and the trigger circuit of the thyristor SCR1. FIGURE 6 shows the magnet 22 fully between the poles 15 which corresponds to the off position of the control pedal. In this position the left hand magnetic circuit (FIGURE 6) is saturated and passage of "on" pulses from TR40 to SCR1 is inhibited (as later described) and the motor will not run. If, as a result of partial depression of the control pedal, the magnet is partly withdrawn from the gap 14 (FIGURE 7), the saturation of the magnetic core is reduced and transmission of "on" pulses to SCR1 is permitted whereby the thyristor SCR1 is fired for a short period (as described in more detail later) and current flows to the motor through cable 19, 19a. This creates magnetic flux in the right hand magnetic circuit which reinforces that remaining in the left hand circuit again to saturate the centre limb and to prevent the transmission of further "on" pulses. Accordingly no further firing of SCR1 can take place until the motor current has decayed and the core flux has been reduced below saturation, when a further firing of SCR1 takes place. Under these conditions the motor runs at slow speed. This speed will increase progressively with movement of the magnet 22 out of the gap until the position of FIGURE 8 is reached (the pedal then being about 90% depressed). In this condition, the magnet has little effect on the saturation state of the core but the current flowing in 19 has. If the value of this current reaches a predetermined upper limit, the effect will be to inhibit firing pulses reaching SCR1 and hence to prevent further rise in current. There is therefore automatic current limitation during acceleration and other conditions of high loading. It should be noted that a similar state exists with displacement of magnet 22 during electrical braking, later described. FIGURE 9 shows the condition at the end of a period of acceleration or other high load, in which the core remains unsaturated and firing pulses pass freely to SCR1. Th motor now runs at maximum pulsed speed.

Attached to the spindle 24 there is a double cam 30 arranged to operate four micro-switches MS1, MS2, RS1 and RS2 as the spindle is rotated by the pedal in either direction from a central position to which the spindle (and pedal) is urged by a centering spring 31. Movement of the spindle in one direction (clockwise as seen in FIGURE 2) from the central position corresponds to forward movement of the truck and movement in the other direction to reverse movement. As may be seen from FIGURE 2, the cam has depressions such that all four switches are open when the cam is in the central position.

There is, in the battery circuit, a key-operated switch KS which, when operated, energises the supply circuit to the controller, and also via a switch and a contactor Con4 the circuit controlling the hydraulic system of the truck. There is also in the supply circuit to the traction motor controller, a switch (H$d$.B$rk$.S$w$) which is closed when a hand brake is released.

Assuming switches KS and H$d$.B$rk$.S$w$ are closed, initial operation of the pedal to rotate the spindle 24 closes reversing microswitch RS1 or RS2 depending on the direction selected.

Further depression of the pedal actuates microswitch MS1 and positive feed is made via normally closed contacts 36 Con1 aux. and Con2 aux. and R7 to a main heat sink 35: (this point is later called the "SCR reference"). Positive feed is made via D4 and reversing switch RS1 or RS2 to either Con1 or Con2 coil and the selected contactor is energised. The motor will not run since the transductor is fully saturated by the control magnet thus inhibiting pulses to the "on" thyristor (SCR1).

When Con1 (or Con2) closes the SCR reference potential rises via the motor to 48 v.+ which provides a contactor hold-in supply since the original feed is broken by the opening of the normally closed auxiliary contacts 36. At the same time the normally open auxiliary contacts 37 close and make positive feed via resistor R1 to the pulse generator.

Still further pedal depression rotates the control magnet 22 out of the gap 14 and pulse repetition rate is progressively increased, resulting in increased torque from the motor. A pulsing voltage now appears at the SCR reference point and the combination of trapping diode D4, freewheel diode D5 and reservoir capacitor C3 (or C6) provides a smoothed supply to hold in Con1 (or Con2) during slow running and acceleration. Non-linear resistors R10 and R11 limit the rise in voltage across the coils when the contactors are de-energised, thus protecting switches RS1 and RS2.

Full pedal operation actuates MS2 and, provided pulse repetition rate has increased to its maximum, thus depressing the mean value of SCR reference voltage below 24 v. and hence raising the voltage across Con3 coil to a level above its pull-in value, Con3 will close. Con3 bypasses the thyristor circuit and connects the supply across the motor, simultaneously selecting the weak field connection at motor field terminal Y2. The motor now runs at maximum speed.

Operation of Con3 closes normally open auxiliary contacts 38 to provide a hold-in circuit for Con1 (or Con2) via R9 and D6, and also opens normally closed auxiliary contacts 39 to prevent firing of "off" pulses. C4 and R12 protect MS2 from peak coil voltages.

As already mentioned, operation of MS1 energises either Con1 or Con2 but no motor current flows since SCR1 is turned off. SCR reference voltage rises to 48 v.+ and, since the "off" thyristor (SCR2) receives a D.C. signal via R4 together with a series of pulses from the generator, commutating capacitor C2 charges to 48 v. (plate $A+ve$).

SCR1 is turned on by a signal from the pulse generator and motor current flows, the SCR reference voltage falling to +1 v. The charge on C2 reverses via SCR1, secondary winding of transformer T1 and D3, and instantaneously applies a reverse voltage to SCR2, thus turning it off. The reversed charge on C2 is trapped by D3 and plate B is now $+ve$. T1 secondary coil limits the peak current in D3 during reversal and provides a resonant circuit to increase the voltage on C2. Due to the transformer action of T1 the effect of the rise in motor current flowing through the primary winding induces a voltage in the secondary winding which increases the final voltage of charge on C2.

After a short time (e.g. approximately 1.2 milliseconds) SCR2 is turned on by a signal from the pulse generator. C2 discharges through SCR2 and applies a reverse voltage to SCR1 thus turning it off. C2 again charges up to battery voltage through the motor and SCR2 (plate $A+ve$). The repetition rate of these pulses will determine the magnitude of motor current and hence the motor torque.

During the interpulse period (i.e. SCR1 "off") the motor current "freewheels" through diode D1. Without this diode an excessive induced motor voltage would occur on turn-off of SCR1 and might damage circuit components.

It should be noted that both series field sections are connected in series during pulse control so that the increased inductance will limit peak currents flowing in SCR1. On full drive one field section only is used for each direction of rotation, and motor runs at maximum speed under weak field condition.

When shorting contactor Con3 is energised C2 is charged up to battery voltage (plate $B+ve$) via R2 so that a commutating charge is available when the system returns to pulsed control on the release of pedal pressure.

Closing of Con3 auxiliary contacts 38 provides a gate feed via R5 to hold SCR1 in conduction when main contacts of Con3 are closed. This ensures that SCR1 will take over immediately Con3 contacts open, and also protects Con3 contacts from severe arcing.

The SCR pulse repetition rate is determined by the degree of saturation of the core of the transductor which is influenced by the field due to the control magnet and the magnetic field due to motor current flowing in the load current winding. Until the motor free-wheel current has fallen to a safe pre-determined value the magnetic field due to this current will saturate the transductor core and inhibit the firing of "on" pulses.

The acceleration of the truck from rest is therefore controlled, irrespective of speed of depression of accelerator pedal. In addition this circuit will limit the current, and hence motor torque, during the climbing of steep gradients under pulse control, and will therefore prevent overloading of transmission, motor, control gear etc.

If the reverse direction is selected when truck is in forward motion the direction of armature induced E.M.F. is reversed and braking current flows through the transductor load current winding and diode D2. The magnetic field due to the current in this coil inhibits pulsing and provides the same current limitation feature as described above thereby permitting braking at a safe maximum current.

If SCR1 should fail to turn off on the firing of a commutating signal the truck would accelerate rapidly, even on initial depression only of control pedal. A safety feature is therefore included to drop out the direction contactor (Con1 or Con2) in this event. During acceleration the coil Con1 (or Con2) is supplied at the mean voltage which exists across SCR1. Should SCR1 turn fully on this voltage falls immediately to +1 v. and the contactor drops out since this is well below its hold-in voltage.

If a short circuit fault exists across SCR1 on starting, the contactor cannot pull in and the whole of the control voltage will appear across R7.

To prevent chatter of Con1 (or Con2) under these fault conditions R8 is fitted to provide a holding circuit for SCR1 until the contactor has dropped out and auxiliary contacts 36 have remade.

THE PULSE GENERATOR

A network consisting of Zener diode Zx1, C1 and R1 provides a stable 10 v. supply to the generator.

The basic pulse generator circuit comprises a free-running multivibrator consisting of a two-stage oscillator in which the transistor in one stage conducts whilst the other is cut off. Then, after a given time, the conditions reverse and the second transistor conducts whilst the first is cut off. The output of this oscillator is a square wave-form since each transistor enables the other to turn off very quickly due to the cross-coupling of inputs and outputs.

The multivibrator is self-starting and when TR31 base current flows through R34 then TR31 will turn fully on and approximately 10 v. will appear across R31, R32 and, since C31 is discharged, across R33. This ensures that TR32 is turned off since no base current can flow. C32 is charged via R35, and C31 is charged via R33 until base potential of TR32 is sufficiently positive to switch TR32 into conduction. This causes a fall in potential across R36, R35, R34 and, since C32 is charged, base of T31 is driven negative and T31 must turn off.

C31 is now charged via R32 and C32 is charged via R34 until TR31 base is again positive, TR31 turns on and cycle repeats itself.

D31 protects TR32 against excessive reverse base/emitter voltage from charge in C31 when TR31 turns off. Similarly D32 protects TR31 from C32 voltage.

Turning on TR31 and TR32 will initiate "off" and "on" pulse signals respectively.

Since the multivibrator has a square wave output, it is essential to modify the rise time of the pulse to match the response of the transductor reactance winding 18 and this is achieved by the pulse shaper circuit which will now be described.

When TR32 turns on, the voltage drop across R40 and R41 is reduced, thus attempting to turn off TR40. Progressive turn off of TR40 is determined by the time constant of network C40, R41, R42 and this provides the required rise time of the output pulse appearing at the collector of TR40 for application to the "on" thyristor trigger circuit.

When TR31 turns on there is a sudden drop in voltage at collector of TR31 and hence at base of TR41 so that TR41 turns on and switches on SCR2 by supplying a trigger signal via R44 in the form of a "block" pulse. D40 is provided to protect TR41 from high reverse voltage which appears at the gate of SCR2 during commutation.

The "on" trigger signal is received across a potential divider formed by R52 and the reactance winding 18 of the transductor.

If the transductor core is saturated the impedance of the winding 18 will be very low and the voltage drop across this winding due to the pulse signal will also be low and insufficient to provide the necessary base current to turn on TR50. Since no base current can flow TR52 is therefore cut off and no "on" trigger signal will be delivered to SCR1.

When the transductor magnetic flux is below saturation point the impedance of the reactance winding will be high and the voltage drop across the winding 18 on receipt of a pulse signal will now be high enough to cause base current to flow via R53 and turn on TR50. TR52 will turn on since base current can flow in R54 and TR50, and a pulse is supplied through R56 to the trigger of SCR1, thus turning it on.

Due to transformer action of the transductor, transient signals can appear across reactance winding 18 due to rapid change of current in the load current winding 19 and D50 protects TR50 from reverse induced voltages. C50 suppresses forward induced voltages to prevent misfiring of SCR1. C50 will also suppress any signals picked up in leads between the trigger circuit and the transductor. D51 is another protective diode.

R57 provides additional bias of TR50 when TR52 turns on, and hence increases the duration of "on" pulse time.

An additional inhibitor circuit is provided to prevent the firing of an "on" pulse if commutating capacitor C2 has not charged up to at least 30 v. during the preceding "off" phase. When SCR2 is turned on C2 is connected across potential divider R6, R50 and R51. Resistor values are so selected that a capacitor voltage under 30 v. will drive TR51 into conduction which will cut off TR52 and hence inhibit the firing of "on" pulses to the gate of SCR1.

The invention is not restricted to the details of the foregoing example. For instance the movable magnet 22 may be replaced by a variable strength electro-magnet fixed in position and controlled by a variable resistor.

I claim:

1. A direct current electrical drive system having a direct current source, a direct current motor having an armature and a field, connected to be energised by the source, controllable switch means having a control input and connected as a power switch between the source and the motor for energising the motor intermittently with current pulses in response to control pulses fed to the control input of the controllable switch means, and a speed control system for controlling the controllable switch means, the said speed control system comprising:
   a magnetic circuit;
   a conductor coupled to said armature and in flux-producing relation with said magnetic circuit;
   a pulse generator for generating control pulses and having an output coupled to the said control input;
   a variable shunt network coupled between the output of the pulse generator and the said control input, the variable shunt network including a flux-controlled impedance element coupled to the said magnetic circuit; and adjustable flux controlling means coupled to said magnetic circuit.

2. A direct current electrical drive system having a direct current source, a direct current motor having an armature and a field, connected to be energised by the source, controllable switch means having a control input and connected as a power switch between the source and the motor for energising the motor intermittently with current pulses in response to control pulses fed to the control input of the controllable switch means, and a speed control system for controlling the controllable switch means, the said speed control system comprising:
   a saturable reactor;
   a conductor coupled to said armature and to said reactor, whereby armature current flowing through said conductor produces magnetic flux in the said saturable reactor;
   a pulse generator for generating control pulses and having an output coupled to the said control input;
   a variable shunt network coupled between the output of the pulse generator and the said control input, the variable shunt network including a reactance winding coupled to said reactor; and adjustable flux-producing means coupled in operative relation to the said saturable reactor.

3. A system as set forth in claim 2 in which the said adjustable flux-producing means comprises a movable magnet.

4. A system as set forth in claim 3 wherein the motor is a series motor and the controllable switch means comprises a thyristor.

References Cited

UNITED STATES PATENTS

| | | | |
|---|---|---|---|
| 3,024,401 | 3/1962 | Dinger | 318—345 X |
| 3,253,204 | 5/1966 | Hudson et al. | 318—345 X |
| 3,213,343 | 10/1965 | Sheheen | 318—341 |
| 3,349,309 | 10/1967 | Dannettell | 318—341 |
| 3,358,206 | 12/1967 | Thiele | 318—341 |

ORIS L. RADER, *Primary Examiner.*

ROBERT J. HICKEY, *Assistant Examiner.*

U.S. Cl. X.R.

318—341